US008215161B2

(12) United States Patent
Yamada

(10) Patent No.: US 8,215,161 B2
(45) Date of Patent: Jul. 10, 2012

(54) FUEL STATE SENSING DEVICE

(75) Inventor: Naoyuki Yamada, Kariya (JP)

(73) Assignee: Denso Corporation, Kariya (JP)

( * ) Notice: Subject to any disclaimer, the term of this patent is extended or adjusted under 35 U.S.C. 154(b) by 130 days.

(21) Appl. No.: 12/813,731

(22) Filed: Jun. 11, 2010

(65) Prior Publication Data

US 2010/0319445 A1 Dec. 23, 2010

(30) Foreign Application Priority Data

Jun. 17, 2009 (JP) ................................ 2009-143954

(51) Int. Cl.
*G01M 15/04* (2006.01)
(52) U.S. Cl. ................................ 73/114.45; 73/114.51
(58) Field of Classification Search ............... 73/114.38, 73/114.45, 114.48, 114.51
See application file for complete search history.

(56) References Cited

U.S. PATENT DOCUMENTS 4,437,342 A * 3/1984 Hosaka et al. ............ 73/114.52
5,226,311 A * 7/1993 Scourtes .................... 73/114.42
6,805,105 B2 * 10/2004 Kato et al. .................... 123/514
6,971,370 B2 * 12/2005 Suenaga et al. ............... 123/436
7,917,281 B2 * 3/2011 Yamada et al. ............... 701/104
8,042,384 B2 * 10/2011 Bailey ........................ 73/114.38
2009/0056677 A1 * 3/2009 Nakata et al. ................. 123/480
2009/0056678 A1 3/2009 Nakata et al.
2009/0063011 A1 3/2009 Nakata et al.
2010/0307457 A1 * 12/2010 Sugiyama et al. ............ 123/478
2010/0308979 A1 * 12/2010 Takashima ............... 340/286.02
2010/0312457 A1 * 12/2010 Yoshida ........................ 701/103
2010/0312501 A1 * 12/2010 Komatsu ......................... 702/50
2010/0319443 A1 * 12/2010 Nakata et al. ............. 73/114.45
2010/0324702 A1 * 12/2010 Yamada et al. ................. 700/47
2010/0324803 A1 * 12/2010 Sugiyama et al. ............ 701/106

FOREIGN PATENT DOCUMENTS

JP 4-65672 3/1992
JP 2003-314331 11/2003
JP 2005-201070 7/2005
JP 2006-200423 8/2006
JP 2007-278477 10/2007

OTHER PUBLICATIONS

U.S. Appl. No. 12/797,070, Yoshida, filed Jun. 9, 2010.
U.S. Appl. No. 12/814,777, Sugiyama et al, filed Jun. 14, 2010.
U.S. Appl. No. 12/817,266, Yamada et al, filed Jun. 17, 2010.
U.S. Appl. No. 12/796,890, Komatsu, filed Jun. 9, 2010.
U.S. Appl. No. 12/796,904, Sugiyama et al, filed Jun. 9, 2010.
U.S. Appl. No. 12/817,286, Nakata et al, filed Jun. 17, 2010.
U.S. Appl. No. 12/796,845, Takashima, filed Jun. 9, 2010.
Japanese Office Action dated May 17, 2011, issued in corresponding Japanese Application No. 2009-143954 with English Translation.

* cited by examiner

*Primary Examiner* — Freddie Kirkland, III
(74) *Attorney, Agent, or Firm* — Nixon & Vanderhye P.C.

(57) ABSTRACT

A fuel state sensing device is applied to an injector injecting fuel, which is supplied from a fuel pump, though an injection hole. The fuel state sensing device has a fuel pressure sensor (bulk modulus sensing section) for sensing a bulk modulus of the fuel existing in a fuel passage extending from a discharge port of the fuel pump to the injection hole. The fuel state sensing device has a fuel temperature sensor (fuel temperature sensing section) for sensing fuel temperature. The fuel state sensing device has an air mixing state calculating section for calculating a quantity or a ratio of air mixing in the fuel as an air mixing quantity or an air mixing ratio based on the sensed bulk modulus and the sensed fuel temperature.

7 Claims, 3 Drawing Sheets

FUEL STATE SENSING DEVICE

CROSS REFERENCE TO RELATED APPLICATION

This application is based on and incorporates herein by reference Japanese Patent Application No. 2009-143954 filed on Jun. 17, 2009.

BACKGROUND OF THE INVENTION

1. Field of the Invention

The present invention relates to a fuel state sensing device that senses a mixing state of air into fuel.

2. Description of Related Art

Concerning fuel supply of fuel used for combustion in an internal combustion engine, there has been known a fuel supply system that supplies the fuel in a tank to a common rail (pressure accumulator) with a high-pressure pump and that performs distribution supply of the fuel accumulated in the common rail to injectors of respective cylinders, thereby injecting the fuel from the injectors (refer to Patent document 1: JP-A-2009-74535).

If a fuel supply route extending from the tank to the injector is obstructed slightly, for example, because a filter provided in the fuel supply route clogs, there is a case where air mixes in the fuel having passed through a narrowed part, at which the fuel supply route is slightly obstructed. It is thought that the mixing of the air occurs because an air component contained in the fuel deposits when the air component passes through the narrowed part (clogged part). It is also thought that the mixing of the air is caused when a damage such as a crack exists in a pipe constituting the fuel supply route and the air mixes into the fuel through the damaged part. If such the deposition and mixing of the air occur and an air quantity mixing into the fuel increases, problems such as extreme decrease in an actual fuel injection quantity as compared to a target fuel injection quantity arise.

However, presently, there is no means to sense an air mixing quantity or an air mixing ratio to the fuel. Therefore, it is difficult to detect deterioration of controllability of the fuel injection quantity.

SUMMARY OF THE INVENTION

It is an object of the present invention to provide a fuel state sensing device that senses a mixing state of air into fuel.

According to a first example aspect of the present invention, a fuel state sensing device is applied to an injector injecting fuel, which is supplied from a fuel pump, though an injection hole. The fuel state sensing device has a bulk modulus sensing section for sensing a bulk modulus of the fuel existing in a fuel passage extending from a discharge port of the fuel pump to the injection hole. The fuel state sensing device has a fuel temperature sensing section for sensing fuel temperature. The fuel state sensing device has an air mixing state calculating section for calculating a quantity or a ratio of air mixing in the fuel as an air mixing quantity or an air mixing ratio based on the sensed bulk modulus and the sensed fuel temperature.

The inventor of the present invention found out that the air mixing quantity or the air mixing ratio can be calculated as a function of the bulk modulus of the fuel existing in the fuel passage extending from the discharge port of the fuel pump to the injection hole and the fuel temperature. According to the above-described aspect of the present invention, the bulk modulus sensing section and the fuel temperature sensing section are provided. The air mixing quantity or the air mixing ratio to the fuel is calculated based on the sensed bulk modulus and the sensed fuel temperature. Accordingly, the calculation of the air mixing state can be realized.

The above-described bulk modulus K is a coefficient K that satisfies a relational expression: $\Delta P=K\cdot\Delta V/V$ in a situation where the pressure and the volume of the fuel change. In the relational expression, K represents the bulk modulus, $\Delta P$ is a pressure change amount accompanying the volume change of the fuel, V is a volume of the fuel passage extending from the discharge port of the fuel pump to the injection hole, and $\Delta V$ is a volume change amount of the fuel passage.

According to a second example aspect of the present invention, the bulk modulus sensing section includes a fuel pressure decrease amount calculating section for calculating a decrease amount of the fuel pressure (equivalent to $\Delta P$) occurring with a single injection and an injection quantity calculating section for calculating an injection quantity of the single injection (equivalent to $\Delta V$). The bulk modulus sensing section calculates the bulk modulus (K) based on the calculated decrease amount ($\Delta P$) and the calculated injection quantity ($\Delta V$).

Focusing on the establishment of the above-mentioned relational expression: $\Delta P=K\cdot\Delta V/V$, the inventor made the invention including calculating the bulk modulus (K) based on the above-described relational expression by calculating the injection quantity (volume change amount $\Delta V$) and the fuel pressure decrease amount (pressure change amount $\Delta P$). Thus, the bulk modulus used for the calculation of the air mixing quantity or the air mixing ratio can be calculated easily.

According to a third example aspect of the present invention, the fuel state sensing device further has a fuel pressure sensor mounted to the injector for sensing the fuel pressure. The fuel pressure decrease amount calculating section calculates the decrease amount based on pressure difference between the fuel pressure sensed with the fuel pressure sensor before an injection start and the fuel pressure sensed with the fuel pressure sensor after an injection end. The injection quantity calculating section calculates the injection quantity based on a fluctuation waveform of the sensed pressure sensed with the fuel pressure sensor.

The fuel pressure sensor mounted to the injector can sense the fuel pressure at a position close to the injection hole. Accordingly, the fluctuation waveform of the fuel pressure occurring with the fuel injection can be obtained. An area of the obtained fluctuation waveform (refer to shaded area in part (b) of FIG. 2) is equivalent to the injection quantity $\Delta V$. The pressure difference between the fuel pressure sensed with the fuel pressure sensor before the injection start and the fuel pressure sensed with the fuel pressure sensor after the injection end is equivalent to the decrease amount $\Delta P$. Therefore, according to the above-described aspect of the present invention, the injection quantity $\Delta V$ and the decrease amount $\Delta P$ used for the calculation of the bulk modulus K can be calculated easily.

According to a fourth example aspect of the present invention, the fuel temperature sensing section is a fuel temperature sensor mounted to the injector for sensing the fuel temperature.

According to the above-described aspect of the present invention, the fuel temperature used for the calculation of the air mixing quantity or the air mixing ratio is sensed with the fuel temperature sensor mounted to the injector. Therefore, the temperature of the fuel at a position distant from the discharge port of the fuel pump can be sensed. Accordingly, the temperature is sensed at the position where an influence of heat generated when the high-pressure pump compresses the fuel is smaller than in the case where a fuel temperature sensor installed outside the injector (for example, fuel temperature sensor installed inside pressure accumulator or fuel temperature sensor installed at discharge port of fuel pump) is used. Therefore, the air mixing quantity or the air mixing ratio can be calculated with high accuracy.

According to a fifth example aspect of the present invention, the fuel state sensing device reports occurrence of a clogging abnormality or a pipe damage abnormality in a fuel supply route extending from a fuel tank to the injection hole when the calculated air mixing quantity or the calculated air mixing ratio is equal to or larger than a predetermined value.

If differential pressure across the filter is to be measured and a clogging abnormality is to be detected based on the measurement value unlike the above-described aspect of the present invention, a sensor for measuring the differential pressure is necessary. As contrasted thereto, according to the above-described aspect of the present invention, such the sensor is unnecessary.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

A sensor system according to an embodiment of the present invention is mounted in an engine (internal combustion engine) for a vehicle. A diesel engine that injects high-pressure fuel and causes compression self-ignition combustion in multiple cylinders #1-#4 is assumed as the engine in the present embodiment.

Figure 1:
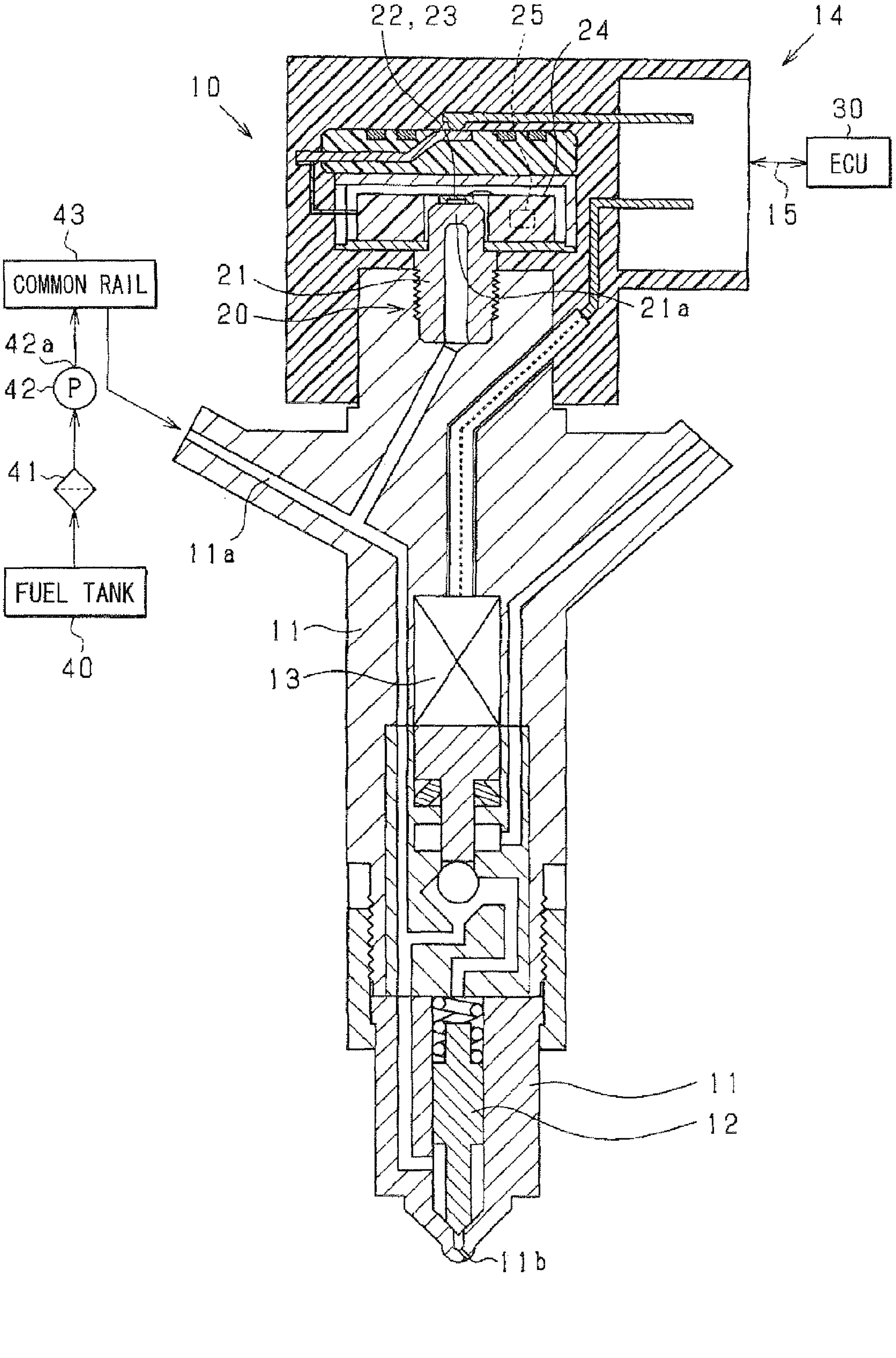
FIG. 1 is a diagram schematically showing a fuel injection system of an internal combustion engine having a fuel state sensing device according to an embodiment of the present invention.

FIG. 1 is a schematic diagram showing an injector 10 mounted in each cylinder of the engine, a sensor device 20 mounted to the injector 10, an electronic control unit 30 (ECU) mounted in the vehicle and the like.

First, a fuel injection system of the engine including the injector 10 will be explained. The fuel in a fuel tank 40 is suctioned by a high-pressure pump 42 (fuel pump) through a filter 41 and is pumped to a common rail 43 (pressure accumulator). The fuel accumulated in the common rail 43 is distributed and supplied to the injectors 10 of the respective cylinders.

The injector 10 has a body 11, a needle 12 (valve member), an actuator 13 and the like as explained below. The body 11 defines a high-pressure passage 11*a* inside and an injection hole 11*b* for injecting the fuel. The needle 12 is accommodated in the body 11 and opens and closes the injection hole 11*b*. The actuator 13 causes the needle 12 to perform the opening-closing operation.

The ECU 30 controls drive of the actuator 13 to control the opening-closing operation of the needle 12. Thus, the high-pressure fuel supplied from the common rail 43 to the high-pressure passage 11*a* is injected from the injection hole 11*b* in accordance with the opening-closing operation of the needle 12. For example, the ECU 30 calculates injection modes such as injection start timing, injection end timing and an injection quantity based on rotation speed of an engine output shaft, an engine load and the like. The ECU 30 controls the drive of the actuator 13 to realize the calculated injection modes.

Next, a hardware construction of the sensor device 20 will be explained.

The sensor device 20 has a stem 21 (strain element), a fuel pressure sensor 22 (bulk modulus sensing section), a fuel temperature sensor 23 (fuel temperature sensing section), a mold IC 24 and the like as explained below. The stem 21 is fixed to the body 11. A diaphragm section 21*a* formed in the stem 21 receives pressure of the high-pressure fuel flowing through the high-pressure passage 11*a* and deforms elastically.

The fuel pressure sensor 22 has a bridge circuit including a pressure-sensitive resistive element fixed to the diaphragm section 21*a*. A resistance of the pressure-sensitive resistive element changes in accordance with a strain amount of the stem 21, i.e., the pressure of the high-pressure fuel (fuel pressure). Thus, the bridge circuit (fuel pressure sensor 22) outputs a pressure sensing signal corresponding to the fuel pressure.

The fuel temperature sensor 23 has a bridge circuit including a temperature-sensitive resistive element fixed to the diaphragm section 21*a*. A resistance of the temperature-sensitive resistive element changes in accordance with temperature of the stem 21 (fuel temperature) that changes depending on temperature of the fuel. Thus, the bridge circuit (fuel temperature sensor 23) outputs a temperature sensing signal corresponding to the fuel temperature.

The mold IC 24 is mounted to the injector 10 together with the stem 21. The mold IC 24 is formed by molding electronic components such as an amplifying circuit that amplifies the pressure sensing signal and the temperature sensing signal, a power supply circuit that applies voltages to the bridge circuits of the fuel pressure sensor 22 and the fuel temperature sensor 23 and a memory 25 (storage device) with a resin. A connector 14 is provided to an upper portion of the body 11. The mold IC 24 and the ECU 30 are electrically connected through a harness 15 connected to the connector 14.

The sensor device 20 is mounted to each of the injectors 10 of the respective cylinders. The ECU 30 receives the pressure sensing signals and the temperature sensing signals from the respective sensor devices 20. The pressure sensing signal changes depending on not only the fuel pressure but also the sensor temperature (fuel temperature). That is, even in the case where the actual fuel pressure is the same, the pressure sensing signal takes different values if the temperature of the fuel pressure sensor 22 at the time differs. In view of this point, the ECU 30 performs temperature compensation by correcting the obtained fuel pressure based on the obtained fuel temperature. Hereafter, the fuel pressure having undergone the temperature compensation in this way will be simply referred to, as the sensed pressure. The ECU 30 performs processing for calculating the injection modes such as the injection start timing, an injection time and the injection quantity of the fuel injected from the injection hole 11*b* by using the sensed pressure that is calculated in this way.

Next, a calculation method of the injection modes will be explained with reference to FIG. 2.

Figure 2:
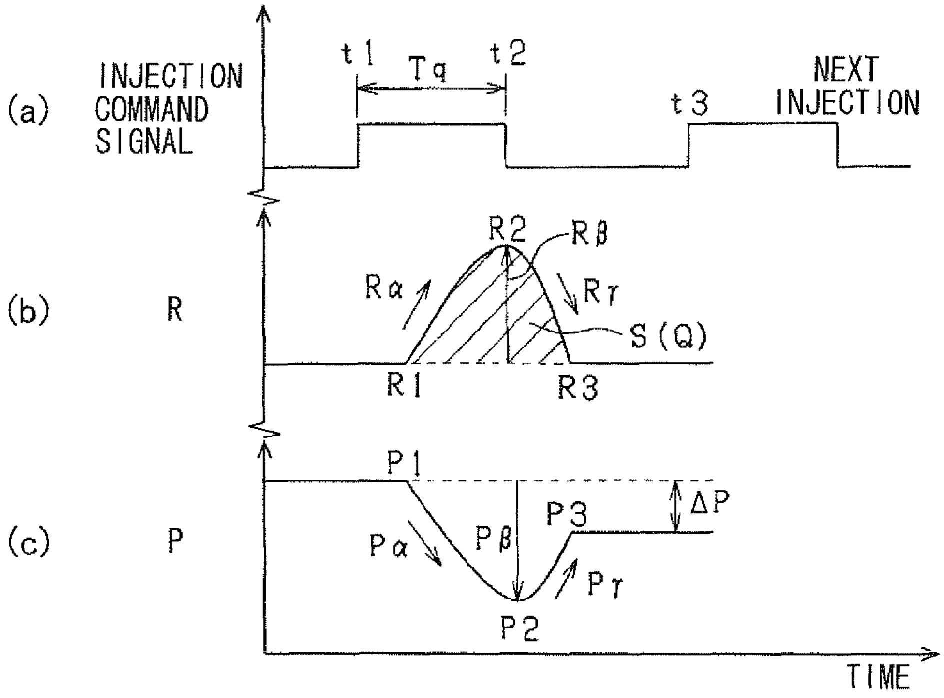
FIG. 2 is a time chart showing a command signal to an injector, an injection rate and sensed pressure according to the embodiment.

Part (a) of FIG. 2 shows an injection command signal outputted from the ECU 30 to the actuator 13 of the injector 10. Due to pulse-on of the command signal, the actuator 13 operates and the injection hole 11*b* opens. That is, an injection start is commanded at pulse-on timing t1 of the injection command signal, and an injection end is commanded at pulse-off timing t2. Therefore, the injection quantity Q is controlled by controlling a valve opening time Tq of the injection hole 11*b* with a pulse-on period of the command signal (i.e., injection command period).

Part (b) of FIG. 2 shows change (transition) of a fuel injection rate R of the fuel from the injection hole 11*b* occurring with the above-described injection command. Part (c) of FIG. 2 shows change (fluctuation waveform) of the sensed pressure P occurring with the change of the injection rate R. There is a correlation between the fluctuation of the sensed pressure P and the change of the injection rate R as explained below. Therefore, a transition waveform of the injection rate R can be estimated from the fluctuation waveform of the sensed pressure P.

That is, after the timing t1 when the injection start command is outputted as shown in part (a) of FIG. 2, the injection rate R starts increasing at timing. R1 and the injection is started. As the injection rate R starts increasing at the timing R1, the sensed pressure P starts decreasing at a changing point P1. Then, as the injection rate R reaches the maximum injection rate at timing R2, the decrease of the sensed pressure P stops at a changing point P2. Then, as the injection rate R starts decreasing at timing R2, the sensed pressure P starts increasing at the changing point P2. Then, as the injection rate R becomes zero and the actual injection ends at timing R3, the increase of the sensed pressure P stops at a changing point P3.

Thus, by detecting the changing points P1 and P3 in the fluctuation of the sensed pressure P, the increase start timing R1 (actual injection start timing) and the decrease end timing R3 (actual injection end timing) of the injection rate R correlated with the changing points P1, P3 can be calculated. In addition, by sensing a pressure decrease rate Pα, a pressure increase rate Pγ and a pressure decrease amount Pβ from the fluctuation of the sensed pressure P, an injection rate increase rate Rα, an injection rate decrease rate Rγ and an injection rate increase amount Rβ correlated with the values Pα, Pγ, Pβ can be calculated.

An integration value of the injection rate R from the actual injection start to the actual injection end (i.e., area of shaded portion S shown in part (b) of FIG. 2) corresponds to the injection quantity Q. An integration value of the pressure P in a portion of the fluctuation waveform of the sensed pressure P corresponding to the change of the injection rate R from the actual injection start to the actual injection end (i.e., portion from changing point P1 to changing point P3) is correlated with the integration value S of the injection rate R. Therefore, the injection rate integration value S equivalent to the injection quantity Q can be calculated by calculating the pressure integration value from the fluctuation of the sensed pressure P.

For example, when clogging of the filter 41 progresses or when an extraneous matter is caught in a fuel passage in the high-pressure pump 42 or a pipe, there is a case where a fuel supply route extending from the fuel tank 40 to the injection hole 11*b* is obstructed slightly. In this case, when the fuel passes through a narrowed portion (clogged portion), which is obstructed slightly, there is a case where an air component contained in the fuel deposits, so the air mixes in the fuel. In addition, when a damage such as a crack exists in the pipe constituting the fuel supply route (i.e., when pipe abnormality exists), there is a case where the air enters an inside of the pipe through the damaged portion, so the air mixes into the fuel.

If the mixing of the air arises and a quantity of the mixed air (air mixing quantity) into the fuel increases, problems such as extreme decrease of the actual fuel injection quantity as compared to the target fuel injection quantity and variation of the actual fuel injection quantity occur. In such the cases, when the ECU 30 performs feedback control to approximate the actual injection quantity Q, which is calculated from the sensed pressure P as mentioned above, to the target injection quantity, it becomes impossible for the ECU 30 to perform the feedback control with high accuracy.

Therefore, according to the present embodiment, the air mixing quantity Qa is calculated as a function of a bulk modulus K and the fuel temperature T. In the present embodiment, the bulk modulus K is calculated using the pressure sensing value P sensed with the fuel pressure sensor 22. The fuel temperature T is calculated using the temperature sensing value sensed with the fuel temperature sensor 23. Then, the air mixing quantity Qa is calculated from the calculation results K, T.

The bulk modulus K is a bulk modulus of the fuel existing in the entire fuel supply route extending from a discharge port 42*a* of the high-pressure pump 42 to the injection holes 11*b* of the respective injectors 10. The bulk modulus K is a coefficient K that satisfies a following relational expression about a pressure change of a certain fluid: $\Delta P=K\cdot\Delta V/V$. In the relational expression, K is the bulk modulus, ΔP is a pressure change amount accompanying a volume change of the fluid, V is a volume, and ΔV is a volume change amount from the volume V. The reciprocal of the coefficient K is equivalent to a compression ratio.

Next, a procedure of the calculation of the bulk modulus K performed by the microcomputer provided in the ECU 30 will be explained with reference to a flowchart shown in FIG. 3.

First in S10 (S means "Step"), the sensed pressure P sensed with the fuel pressure sensor 22 is obtained. In following S11 (fuel pressure decrease amount calculating section), the decrease amount ΔP of the fuel pressure P occurring with the single injection is calculated from the fluctuation waveform (refer to part (c) of FIG. 2) indicating the transition of the obtained sensed pressure P. More specifically, the decrease amount ΔP of the fuel pressure P caused from the injection start timing to the injection end timing is calculated by subtracting the sensed pressure P at the changing point P3 from the sensed pressure P at the changing point P1.

In following S12 (injection quantity calculating section), the injection quantity Q is calculated from the fluctuation waveform. More specifically, as mentioned above, the transition waveform of the injection rate R shown in part (b) of FIG. 2 is calculated from the fluctuation waveform shown in part (c) of FIG. 2. Then, the integration value S (injection quantity Q) of the injection rate R from the actual injection start to the actual injection end is calculated using the calculated transition waveform.

In following S13, the bulk modulus K is calculated based on the decrease amount ΔP calculated in S11 and the injection quantity Q calculated in S12. More specifically, ΔP in the above-described relational expression ($\Delta P=K\cdot\Delta V/V$) is equivalent to the decrease amount ΔP, and ΔV is equivalent to the injection quantity Q. A value measured and stored in the memory 25 beforehand is used as V. The bulk modulus K is calculated by substituting the decrease amount ΔP, the injection quantity Q (ΔV) and the measurement value V into the above-described relational expression.

Next, a procedure of the calculation of the air mixing quantity Qa performed by the microcomputer provided in the ECU 30 will be explained with reference to a flowchart of FIG. 4.

Figure 3:
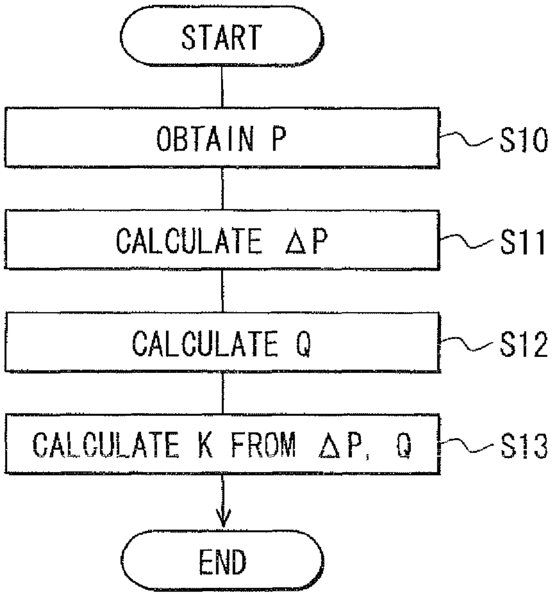
FIG. 3 is a flowchart showing a procedure for calculating a bulk modulus according to the embodiment.

First, in S20, the bulk modulus K calculated in S13 of FIG. 3 is obtained. In following S21, the sensed temperature T sensed with the fuel temperature sensor 23 is obtained.

In following S22 (air mixing state calculating section), the air mixing quantity Qa is calculated based on the bulk modulus K obtained in S20 and the sensed temperature T obtained in S21. Hereafter, a method for calculating the air mixing quantity Qa from the bulk modulus K and the sensed temperature T will be explained.

Acoustic velocity "a" in the fuel, in which the air is mixed (i.e., air-mixed fuel), is expressed with a following Expression 1.

$$\frac{1}{a}=\sqrt{\frac{\gamma_w-(\gamma_w-\gamma_a)\frac{V_a}{V}}{g}\times\frac{1+\left(\frac{K_w}{K_a}-1\right)\frac{V_a}{V}}{K_w}} \quad \text{Expression 1}$$

In the Expression 1, γw represents the specific gravity of the fuel, in which no air is mixed, γa is the specific gravity of the air, Va is a volume of the air mixed in the fuel (equivalent to air mixing quantity Qa), V is a volume of the air-mixed fuel, g is the gravity acceleration, Kw is the bulk modulus of the fuel, in which no air is mixed, and Ka is the bulk modulus of the air.

γw, γa and g are the known numerical values. V is equivalent to the volume of the fuel route (for example, route extending from discharge port 42*a* of high-pressure pump 42 to injection hole 11*b*) and can be obtained beforehand. The values of Kw and Ka can be obtained beforehand by examination, However, since the values of Kw and Ka take different values depending on the temperature, it is required to obtain the values of Kw and Ka for each temperature. Therefore, the above-described sensed temperature T is necessary for specifying the values of Kw and Ka.

The above-described acoustic velocity "a" can be expressed also with a following Expression 2. ρwa in the Expression 2 can be expressed with a following Expression 3. γwa in the Expression 3 can be expressed with a following Expression 4, Kwa represents the bulk modulus of the air-mixed fuel, ρwa is the density of the air-mixed fuel, and γwa is the specific gravity of the air-mixed fuel.

$$a=\sqrt{\frac{K_{wa}}{\rho_{wa}}} \quad \text{Expression 2}$$

$$\rho_{wa}=\frac{\gamma_{wa}}{g} \quad \text{Expression 3}$$

$$\gamma_{wa}=\gamma_a\frac{V_a}{V}+\gamma_w\frac{V-V_a}{V} \quad \text{Expression 4}$$

Therefore, the acoustic velocity "a" in the air-mixed fuel can be expressed with Kwa, g, γa, γw, V and Va (equivalent to air mixing quantity Qa) by obtaining a numerical expression by substituting the Expression 4 into γwa of the Expression 3 and by substituting the obtained numerical expression into ρwa of the Expression 2. That is, the acoustic velocity "a" can be expressed with a function of Va and Kwa.

The Expression 1 expresses the acoustic velocity "a" with the function of Va. Therefore, Va (equivalent to air mixing quantity Qa) can be expressed with a function of Kwa by solving simultaneous equations consisting of an equation, which is obtained from the Expressions 2 to 4, and the Expression 1. Thus, the values of Kw and Ka in the Expression 1 can be specified if the sensed temperature T is known. Va (equivalent to air mixing quantity Qa) can be calculated if the bulk modulus K (equivalent to bulk modulus Kwa of air-mixed fuel) is known.

Figure 4:
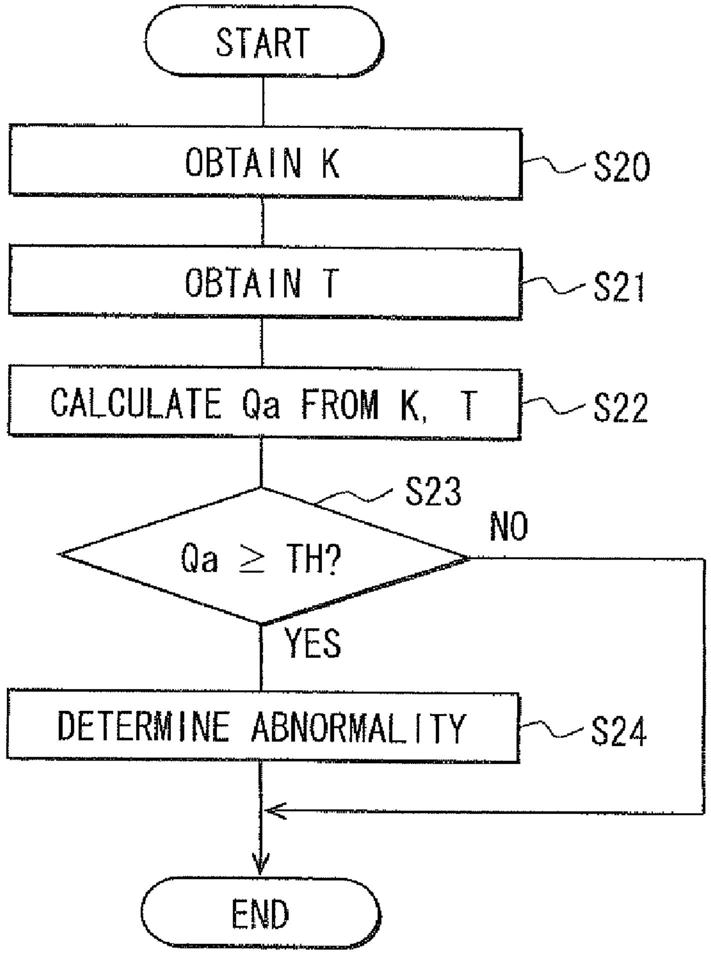
FIG. 4 is a flowchart showing a procedure for calculating an air mixing quantity to fuel according to the embodiment.

In following S23 in FIG. 4, it is determined whether the air mixing quantity Qa calculated in S22 is "equal to or larger than" a threshold value TH. If the air mixing quantity Qa is smaller than the threshold value TH, the processing of FIG. 4 is ended. If the air mixing quantity Qa is equal to or larger than the threshold value TH, it is determined that a clogging abnormality or a pipe damage exists in the fuel supply route, i.e., an abnormality is determined, in following S24. In this case, a diagnostic signal indicating the abnormality is outputted and the abnormality is reported to an operator of the internal combustion engine.

The present embodiment described above exerts following effects.

(1) The bulk modulus K and the fuel temperature T are sensed, and the air mixing quantity Qa is calculated by substituting the sensed bulk modulus K and the fuel temperature T into the function f(K, T). Accordingly, the calculation of the air mixing quantity Qa can be realized.

(2) In a stage before mounting the injector 10 in the internal combustion engine and shipping the product to the market, the bulk modulus K can be obtained by examination. However, the bulk modulus K changes according to fuel properties such as viscosity and the specific gravity of the fuel used at that time, the temperature of the used fuel and the like. Therefore, if the bulk modulus K obtained by the examination before the shipping to the market is used as it is, there is a concern that the bulk modulus K shifts from the actual bulk modulus K.

As contrasted thereto, according to the present embodiment, the bulk modulus K is sensed (calculated) in an on-board state using the sensed pressure P sensed with the fuel pressure sensor 22. Therefore, the bulk modulus K can be calculated at each predetermined time (or at each predetermined travel distance) even after the shipping to the market. Accordingly, the actual bulk modulus K can be calculated with high accuracy and the calculation accuracy of the air mixing quantity Qa can be improved.

(3) The fuel temperature T used for the calculation of the air mixing quantity Qa is sensed with the fuel temperature sensor 23 mounted to the injector 10. Therefore, the temperature is sensed at a position where an influence of heat, which is generated when the high-pressure pump 42 compresses the fuel, is smaller than in the case where a fuel temperature sensor installed at the discharge port 42*a* of the high-pressure pump 42 is used. Therefore, the air mixing quantity Qa can be calculated with high accuracy.

(4) In the present embodiment, the abnormality is determined when the air mixing quantity Qa is equal to or larger than the predetermined threshold value TH. If a clogging abnormality is to be determined based on differential pressure across the filter 41 differently from the present embodiment, a differential pressure sensor for measuring the differential pressure is necessary. As contrasted thereto, according to the present embodiment, the air mixing quantity Qa can be calculated by using the sensing values of the fuel pressure sensor 22 and the fuel temperature sensor 23 used for the fuel injection control. Therefore, the clogging abnormality of the filter 41 and the pipe damage abnormality can be determined without necessitating the differential pressure sensor.

Other Embodiments

The present invention is not limited to the above-described embodiments but may be modified and implemented as follows, for example. Further, characteristic constructions of the embodiment may be combined arbitrarily.

In the above-described embodiment, the air mixing quantity Qa (equivalent to Va in Expression 1) is calculated in S22 of FIG. 4. Alternatively, an air mixing ratio Va/V as a ratio of the volume Va of the air mixed in the fuel (air mixing quantity Qa) to the volume of the air-mixed fuel may be calculated. The air mixing ratio Va/V can be calculated by using the bulk modulus K, the sensed temperature T and the Expressions 1 to 4. In this case, it may be determined that the clogging abnormality or the pipe damage exists when the air mixing ratio Va/V is equal to or larger than a threshold value TH1 in S23 of FIG. 4.

In the above-described embodiment, the fuel temperature T used for the calculation of the air mixing quantity Qa is sensed with the fuel temperature sensor 23 mounted to the injector 10. Alternatively, for example, the fuel temperature T may be sensed with a fuel temperature sensor installed at the discharge port 42*a* or a suction port of the high-pressure pump 42.

In the above-described embodiment, the bulk modulus K (decrease amount ΔP and injection quantity Q (ΔV)) used for the calculation of the air mixing quantity Qa is sensed with the fuel pressure sensor 22 mounted to the injector 10. Alternatively, for example, the bulk modulus K may be sensed with a fuel pressure sensor provided to the common rail 43.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel state sensing device applied to an injector injecting fuel, which is supplied from a fuel pump, though an injection hole, the fuel state sensing device comprising:

a bulk modulus sensing means for sensing a bulk modulus of the fuel existing in a fuel passage extending from a discharge port of the fuel pump to the injection hole;

a fuel temperature sensing means for sensing fuel temperature; and an air mixing state calculating means for calculating a quantity or a ratio of air mixing in the fuel as an air mixing quantity or an air mixing ratio based on the sensed bulk modulus and the sensed fuel temperature; wherein the bulk modulus sensing means includes a fuel pressure decrease amount calculating means for calculating a decrease amount of the fuel pressure occurring with a single injection and an injection quantity calculating means for calculating an injection quantity of the single injection, and the bulk modulus sensing means calculates the bulk modulus based on the calculated decrease amount and the calculated injection quantity.

2. The fuel state sensing device as in claim 1, further comprising:

a fuel pressure sensor mounted to the injector for sensing the fuel pressure, wherein the fuel pressure decrease amount calculating means calculates the decrease amount based on pressure difference between the fuel pressure sensed with the fuel pressure sensor before an injection start and the fuel pressure sensed with the fuel pressure sensor after an injection end, and the injection quantity calculating means calculates the injection quantity based on a fluctuation waveform of the sensed pressure sensed with the fuel pressure sensor.

3. The fuel state sensing device as in claim 1, wherein the fuel temperature sensing means is a fuel temperature sensor mounted to the injector for sensing the fuel temperature.

4. The fuel state sensing device as in claim 1, wherein the fuel state sensing device reports occurrence of a clogging abnormality or a pipe damage abnormality in a fuel supply route extending from a fuel tank to the injection hole when the calculated air mixing quantity or the calculated air mixing ratio is equal to or larger than a predetermined value.

5. A method of sensing a fuel state of fuel injected by an injector and supplied from a fuel pump, though an injection hole, the method comprising:

sensing a bulk modulus of the fuel existing in a fuel passage extending from a discharge port of the fuel pump to the injection hole;

sensing fuel temperature; and calculating a quantity or a ratio of air mixing in the fuel as an air mixing quantity or an air mixing ratio based on the sensed bulk modulus and the sensed fuel temperature; wherein a decrease amount of the fuel pressure occurring with a single injection is calculated and an injection quantity of the single injection is calculated, and the bulk modulus is calculated based on the calculated decrease amount and the calculated injection quantity.

6. The method as in claim 5, wherein:

a fuel pressure sensor is mounted to the injector for sensing the fuel pressure;

the decrease amount is calculated based on a pressure difference between the fuel pressure sensed with the fuel pressure sensor before an injection start and the fuel pressure sensed with the fuel pressure sensor after an injection end, and the injection quantity is calculated based on a fluctuation waveform of the pressure sensed with the fuel pressure sensor.

7. The method as in claim 5, wherein occurrence of a clogging abnormality or a pipe damage abnormality in a fuel supply route extending from a fuel tank to the injection hole is reported when the calculated air mixing quantity or the calculated air mixing ratio is equal to or larger than a predetermined value.

* * * * *